(12) United States Patent
Ono

(10) Patent No.: US 9,430,707 B2
(45) Date of Patent: Aug. 30, 2016

(54) FILTERING DEVICE AND ENVIRONMENT RECOGNITION SYSTEM

(71) Applicant: Fuji Jukogyo Kabushiki Kaisha, Tokyo (JP)

(72) Inventor: Hiroyuki Ono, Tokyo (KP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 14/477,600

(22) Filed: Sep. 4, 2014

(65) Prior Publication Data

US 2015/0092984 A1 Apr. 2, 2015

(30) Foreign Application Priority Data

Sep. 30, 2013 (JP) .................................. 2013-205391

(51) Int. Cl.
*G06K 9/00* (2006.01)
*G06T 7/00* (2006.01)

(52) U.S. Cl.
CPC ........... *G06K 9/00805* (2013.01); *G06T 7/003* (2013.01); *G06T 7/0022* (2013.01); *G06T 7/0026* (2013.01); *G06T 2207/10004* (2013.01); *G06T 2207/20024* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 6,366,691 B1 * | 4/2002 | Sogawa | ................ | G06T 7/0075 348/116 |
| 6,658,150 B2 * | 12/2003 | Tsuji | .................... | G06K 9/6203 348/E13.014 |
| 2001/0055418 A1 * | 12/2001 | Nakamura | ............ | G06T 7/0022 382/154 |
| 2004/0061712 A1 * | 4/2004 | Sogawa | ................. | G01C 11/06 345/698 |
| 2005/0008220 A1 * | 1/2005 | Miyazaki | ............... | G01C 11/06 382/154 |
| 2006/0029272 A1 * | 2/2006 | Ogawa | ..................... | G06K 9/32 382/154 |
| 2009/0237491 A1 * | 9/2009 | Saito | ...................... | G01C 11/06 348/47 |
| 2011/0293172 A1 * | 12/2011 | Sakamoto | .......... | H04N 13/0033 382/154 |
| 2013/0038698 A1 * | 2/2013 | Yoshida | ............. | H04N 13/0022 348/47 |
| 2014/0072180 A1 * | 3/2014 | Yamaguchi | ........... | G06T 7/2053 382/107 |
| 2015/0091714 A1 * | 4/2015 | Ono | .................... | G06K 9/00791 340/435 |
| 2015/0092990 A1 * | 4/2015 | Ono | ................... | G06K 9/00791 382/104 |

FOREIGN PATENT DOCUMENTS

JP 3287465 B2 6/2002
JP 3349060 B2 11/2002

* cited by examiner

*Primary Examiner* — Bhavesh Mehta
*Assistant Examiner* — Narek Zohrabyan
(74) *Attorney, Agent, or Firm* — McDermott Will & Emery LLP

(57) ABSTRACT

A filtering device includes an evaluation value deriving module that derives, for a pair of generated images having mutual relevance, multiple evaluation values indicative of correlations between any one of blocks extracted from one of the images and multiple blocks extracted from the other image, respectively, a reference waveform part setting module that sets a reference waveform part of a transition waveform comprised of the multiple evaluation values, the reference waveform part containing the evaluation value having the highest correlation, and a difference value determining module that determines whether one or more similar waveform parts similar to the reference waveform part exist in the transition waveform, and determines, based on the result of the determination, whether the evaluation value with the highest correlation is valid as a difference value.

10 Claims, 10 Drawing Sheets

FILTERING DEVICE AND ENVIRONMENT RECOGNITION SYSTEM

CROSS-REFERENCE TO RELATED APPLICATION

The present application claims priority from Japanese Patent Application No. 2013-205391 filed on Sep. 30, 2013, the entire contents of which are hereby incorporated by reference.

BACKGROUND

1. Technical Field

The present disclosure relates to a filtering device and an environment recognition system which determine, when calculating a difference value (parallax) of an object among multiple comparison targets, whether the difference value is valid.

2. Related Art

There are conventionally known a technique, such as collision avoidance control, which detects specific objects including another vehicle located ahead of a vehicle, and avoids a collision with a leading vehicle, and a technique, such as a cruise control, which controls so as to maintain an inter-vehicle distance with a leading vehicle at a safe distance (for instance, see Japanese Patent (JP-B) No. 3,349,060).

Such a collision-avoidance control and cruise control derive a parallax by using so-called pattern matching, in order to acquire a relative distance from the vehicle, of an object located ahead the vehicle. The pattern matching acquires image data from, for example, each of two imaging devices of which viewpoints differ from each other. The pattern matching then extracts any one of blocks (hereinafter, referred to as "the reference block) from an image (hereinafter, referred to as "the reference image") based on the image data generated by one of the imaging devices, and then searches a highly-correlated block (hereinafter, referred to as "the comparison block) from an image (hereinafter, referred to as "the comparison image") based on the image data generated by the other imaging device. Then, the pattern matching refers to imaging parameters, such as installed positions and focal lengths of the imaging devices, uses so-called a stereo method or a triangulation method to calculate relative distances of the object with respect to the imaging devices based on the derived parallax, and converts the calculated relative distances into three-dimensional (3D) positional information which contains a horizontal distance and a height of the object in addition to the calculated relative distances. Further, various recognition processing are performed using the 3D positional information. Note that the term "horizontal" as used herein refers to screen transverse or lateral directions, and the term "vertical (described later)" as used herein refers to screen vertical directions which are perpendicular to the horizontal directions.

The pattern matching calculates a correlation of a block in the comparison image with each block in the reference image, while horizontally shifting the block in the comparison image, and uses a difference (difference value) in coordinates between the comparison image of the most-correlated block and the corresponding block in the reference image, as the parallax. However, when objects having similar features are located horizontally or subject parts having similar features are located horizontally in one object, one feature may be matched with other similar objects or subject parts, leading to an erroneous derivation of the parallax.

Therefore, for example, JP-B No. 3,287,465 discloses another pattern matching technique that, when one reference block in the comparison image has the highest correlation with multiple reference blocks in the reference image, determines only a parallax regarding the reference block having the minimum parallax to be valid.

However, for example, in a case where three or more similar objects or subject parts continue, if one object in the reference image is matched with another object or subject part in the comparison image located apart from the position of the object in the reference image, the derived parallax (difference value) will be greatly different from a correct parallax, and there may be a possibility that an object located away or deeper from another object located closer to or toward the vehicle is erroneously determined to have an opposite or reversed positional relation. In such a case, even if the technique of JP-B No. 3,287,465 is adopted, still the same results will be obtained as well if the erroneously-derived parallax is once determined to be valid. Therefore, in such a case where similar objects or similar subject parts continue, the parallax which should be invalidated cannot be effectively excluded.

SUMMARY OF THE INVENTION

The present disclosure has been designed in consideration of the circumstances described above, and an object thereof is to provide a filtering device and an environment recognition system, that appropriately evaluate evaluation values of an evaluation function to effectively exclude difference value which should be invalidated.

According to one aspect of the present disclosure, a filtering device is provided, which includes an evaluation value deriving module that derives, for a pair of comparison targets having mutual relevance, multiple evaluation values indicative of correlations between an extracted part that is selectively extracted from one of the comparison targets and multiple extracted parts extracted from the other comparison target, respectively, a reference waveform part setting module that sets a reference waveform part of a transition waveform comprised of the multiple evaluation values, the reference waveform part containing the evaluation value with the highest correlation, and a difference value determining module that determines whether one or more similar waveform parts similar to the reference waveform part exist in the transition waveform, and determines, based on the result of the determination, whether the evaluation value with the highest correlation is valid as a difference value.

The difference value determining module may select as the similar waveform part, a waveform part of which one or more parameters are close to the parameters of the reference waveform part. The one or more parameters may be selected from the group consisting of: an absolute value of the evaluation value at which an inclination of the transition waveform becomes zero; a difference between the evaluation value with the highest correlation and an evaluation value of an inflection point at which the inclination of the transition waveform becomes zero for the first time; and a horizontal difference between the evaluation value with the highest correlation and an evaluation value of an inflection point that satisfies a predetermined condition.

The reference waveform part setting module may select as the reference waveform part either one of two waveform parts located from a first inflection point at which the evaluation value has the highest correlation to two, second and third inflection points before and after the first inflection point in horizontal directions at which inclinations of the transition waveform become zero for the first time, respectively, the either one of the waveform parts having a larger difference between the evaluation value of the first inflection point with the highest correlation and an evaluation value of either one of the second and third inflection points.

The comparison target may be an image and the extracted part may be a block consisting of one or more pixels in the image.

According to another aspect of the present disclosure, an environment recognition system is provided, which includes one or more imaging devices that generate a pair of images having mutual relevance, an evaluation value deriving module that derives, for the pair of generated images, multiple evaluation values indicative of correlations between any one of blocks extracted from one of the images and multiple blocks extracted from the other image, respectively, a reference waveform part setting module that sets a reference waveform part of a transition waveform comprised of the multiple evaluation values, the reference waveform part containing the evaluation value having the highest correlation, and a difference value determining module that determines whether one or more similar waveform parts similar to the reference waveform part exist in the transition waveform, and determines, based on the result of the determination, whether the evaluation value with the highest correlation is valid as a parallax.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
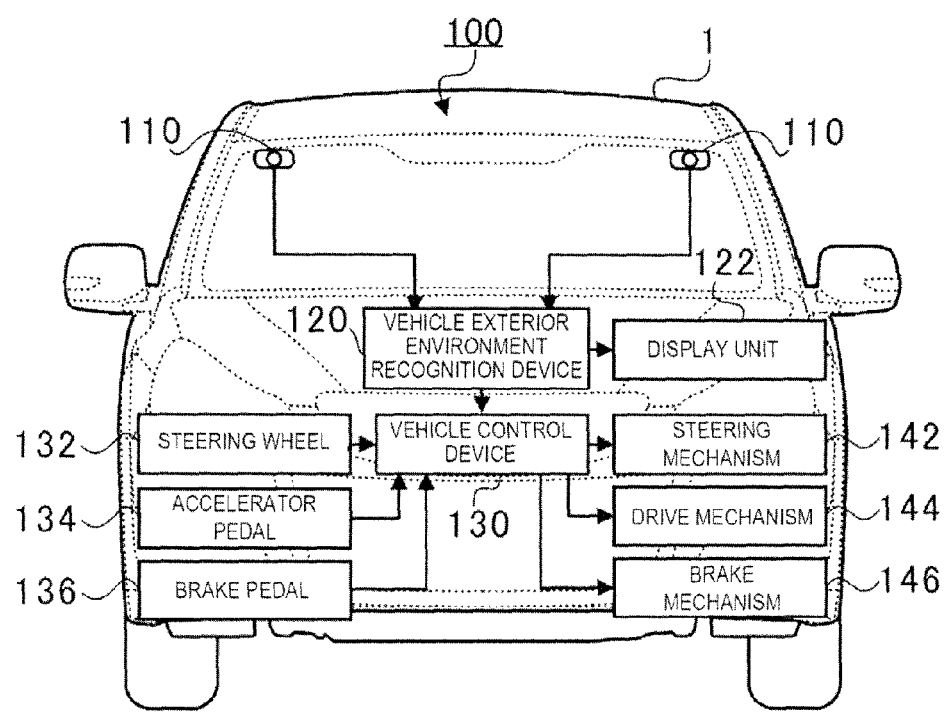
FIG. 1 is a block diagram illustrating a connecting relation of an environment recognition system.

Hereinafter, a suitable example of the present disclosure will be described in detail with reference to the accompanying drawings. Dimensions, material, concrete numerical values, etc. illustrated in this example are merely instances for easier understanding of the present disclosure, and, unless otherwise particularly specified, these instances are not intended to limit the present disclosure. Note that, in this description and the accompanying drawings, elements having substantially the same function and configuration are denoted with the same reference numerals in order to omit redundant explanations, and any other elements which are not directly related to the present disclosure are not illustrated in the accompanying drawings.

In recent years, vehicles having so-called a collision avoidance function (adaptive cruise control: ACC) have been spreading. This function images the road environment ahead of a vehicle where on-board cameras are mounted, identifies an object, such as leading vehicle, based on color information and/or positional information obtained from the images (comparison targets), and thereby avoiding a collision with the identified object and/or maintains an inter-vehicle distance with the leading vehicle at a safe distance.

The collision avoidance function uses, for example, a pair of imaging devices of which viewpoints differ from each other in order to acquire a relative distance from the vehicle, of objects located ahead of the vehicle, compares an image acquired from one of the imaging devices with another image acquired from the other imaging device to extract highly-correlated blocks (extracted parts) by using so-called pattern matching. These images are used herein as a pair of comparison targets, and one is called a "reference image," and the other is called a "comparison image." However, if multiple objects have similar features continuously appearing in the horizontal directions in the images, or if one object has multiple subject parts having similar features appearing continuously in the horizontal directions, the object or the subject part may be matched with another similar object or subject parts, resulting in an erroneous derivation of a parallax (a difference value). Thus, a purpose of this example is to determine whether a transition waveform that is a waveform formed by an evaluation value in an evaluation function of the pattern matching, that is, a waveform that is similar to a waveform near a minimum of the evaluation value (a value where correlation becomes highest) exists (i.e., whether the waveform has repeatability), and then effectively exclude a parallax which should be invalidated. Note that the term "block" as used herein refers to part of an image comprised of one or more pixels. Below, an environment recognition system for achieving such a purpose will be described, as well as a filtering device provided to a vehicle exterior environment recognition device that is a particular component of the system will be described in detail.

(Environment Recognition System 100)

FIG. 1 is a block diagram illustrating a connecting relation of the environment recognition system 100. The environment recognition system 100 is comprised of a pair of imaging devices 110 mounted inside a vehicle 1 (hereinafter, simply referred to as "the vehicle"), a vehicle exterior environment recognition device 120, and a vehicle control device 130 (which is typically comprised of an electronic control unit (ECU)).

Each imaging device 110 is comprised of imaging elements, such as charge-coupled devices (CCDs) or complementary metal-oxide semiconductors (CMOSs). Each imaging device 110 can image the environment ahead of the vehicle 1 to generate a color image consisting of three hues (R (red), G (green) and B (blue)) or a monochrome image. Note that the color image imaged by the imaging device 110 is adopted as a luminance image to distinguished it from a distance image described later.

Moreover, the two imaging devices 110 are disposed so as to be separated from each other in substantially lateral or horizontal directions such that they are oriented facing to the traveling direction of the vehicle 1 to have their optical axes being oriented substantially parallel to each other. Each imaging device 110 sequentially generates image data which is obtained by imaging objects existing within a detection area ahead of the vehicle 1 per frame, for example, at every 1/60 seconds (i.e., 60 fps). Note that the term "object" to be recognized as used herein refers not only to a solid object existing independently, such as a vehicle, a pedestrian, a traffic light, a road surface (traveling path), a guardrail, and a building, but also to an object that can be identified as part of the solid object, such as a taillight, a blinker, each illuminating part of the traffic light. Each functional module described below carries out processing for every frame, triggered by a refreshing of such image data.

The vehicle exterior environment recognition device 120 acquires the image data from each of the two imaging devices 110, derives the parallax using so-called pattern matching, and associates the derived parallax information (corresponding to a relative distance described later) with the image data to generate the distance image. The pattern matching will be described later in detail. Further, the vehicle exterior environment recognition device 120 uses the luminance based on the luminance image and three-dimensional (3D) positional information in real space containing the relative distance with respect to the vehicle 1 based on the distance image to group blocks, of which the luminance are equal and the 3D positional information are close to each other, as one unitary object, and then identifies specific objects to which the object in the detection area ahead of the vehicle 1 corresponds.

When the specific object is identified, the vehicle exterior environment recognition device 120 derives a relative speed and the like of the specific object (for example, a leading vehicle) while tracking the specific object, and then determines whether a possibility of the specific object colliding with the vehicle 1 is high. Here, if the vehicle exterior environment recognition device 120 determines that the possibility of a collision is high, the vehicle exterior environment recognition device 120 then gives (informs) a vehicle operator a warning indication through a display unit 122 installed in front of the operator and outputs information indicative of the warning to the vehicle control device 130.

The vehicle control device 130 accepts operational inputs of the operator through a steering wheel 132, an accelerator (gas pedal) 134, and a brake pedal 136, and transmits the inputs to a steering mechanism 142, a drive mechanism 144, and a brake mechanism 146, respectively, to control the vehicle 1. The vehicle control device 130 also controls the drive mechanism 144 and the brake mechanism 146 according to instructions from the vehicle exterior environment recognition device 120.

Next, the configuration of the vehicle exterior environment recognition device 120 will be described in detail. Note that only processing for obtaining the parallax of the object by the filtering device, which is a feature of this example, will be described in detail herein and, thus, description of any other configurations unrelated to the feature of this example will be omitted.

(Vehicle Exterior Environment Recognition Device 120)

Figure 2:
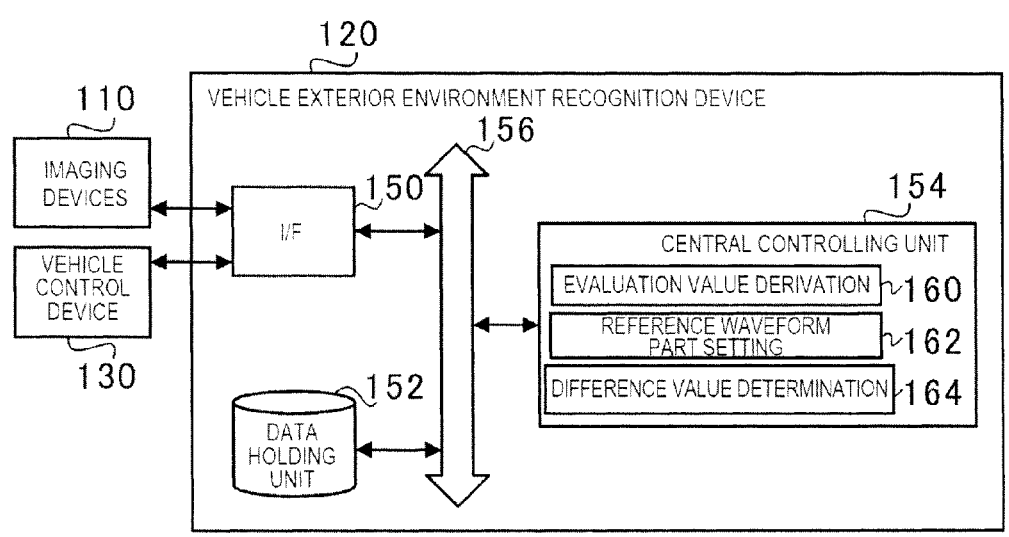
FIG. 2 is a functional block diagram schematically illustrating functions of a vehicle exterior environment recognition device.

FIG. 2 is a functional block diagram schematically illustrating functions of the vehicle exterior environment recognition device 120. As illustrated in FIG. 2, the vehicle exterior environment recognition device 120 is comprised of an I/F unit 150, a data holding unit 152, and a central controlling unit 154.

The I/F unit 150 is an interface that performs bidirectional information exchanges with the imaging devices 110 and the vehicle control device 130. The data holding unit 152 is comprised of one or more RAMs, one or more flash memories, one or more HDDs, etc. and holds various information required for the processing of each functional module described below and temporarily holds the image data received from the imaging devices 110.

The central controlling unit 154 is comprised of one or more integrated circuits containing one or more central processing units (CPUs), one or more ROMs where one or more programs and the like are stored, or one or more RAMs as work areas, and controls the I/F unit 150, the data holding unit 152, etc. through a system bus 156. In this example, the central controlling unit 154 also functions as an evaluation value deriving module 160, a reference waveform part setting module 162, and a difference value determining module 164. The evaluation value deriving module 160, the reference waveform part setting module 162, and the difference value determining module 164 also function as the filtering device. Next, the pattern matching processing will be described in detail.

(Pattern Matching Processing)

The evaluation value deriving module 160 acquires the image data from each of the two imaging devices 110. Based on the acquired two pieces of image data which have mutual relevance, the evaluation value deriving module 160 then extracts any one of blocks from one of the images which will be used as a reference (reference image), while extracting multiple blocks (comparison targets) from the other image (comparison image). The evaluation value deriving module 160 derives multiple evaluation values indicative of correlations between the reference block and the comparison block.

The pattern matching may be a comparison in luminance (Y color-difference signal) per block between the pair of images. For example, the pattern matching includes approaches, such as a sum of absolute difference (SAD) in which a difference in luminance is calculated, a sum of squared intensity difference (SSD) which uses values obtained by squaring the differences, and a normalized cross correlation (NCC) which uses similarities of variances obtained by subtracting an average value of the luminance of pixels from the luminance of each pixel. Among these approaches, SAD will be particularly described herein as an instance. In this example, average value difference matching is also performed. This average value difference matching calculates an average value of the luminance of pixels around a block in the reference image and the comparison image, respectively, and subtracts each average value from the luminance of the pixels within the block to derive evaluation values. Next, the average value difference matching will be described in detail.

Figure 3A:
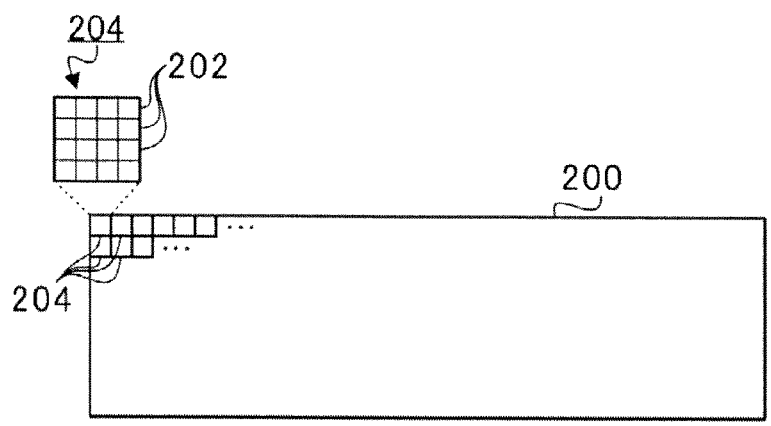
FIGS. 3A to 3C illustrate average value difference matching.
Figure 3B:
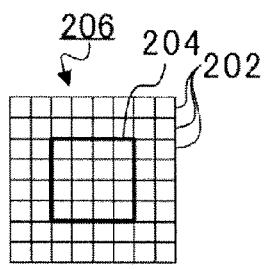
Figure 3C:
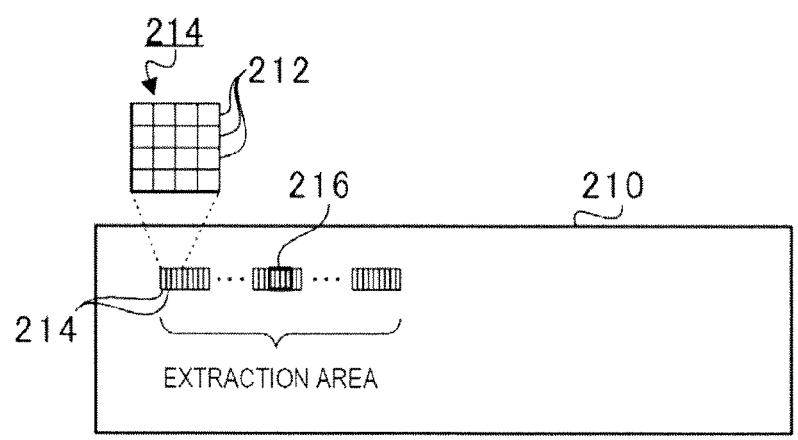

FIGS. 3A to 3C illustrate the average value difference matching. As illustrated in FIG. 3A, the evaluation value deriving module 160 first extracts a block 204 (hereinafter, referred to as "the reference block") comprised of a matrix of pixels 202, for example, consisting of 4 pixels in the horizontal directions×4 pixels in the vertical directions, from the reference image 200. The evaluation value deriving module 160 sequentially repeats the processing per block, by extracting another reference block 204 and deriving the parallax for each extracted reference block 204. While the reference block 204 is comprised of 4 pixels in the horizontal directions×4 pixels in the vertical directions in this example, any number of pixels within the reference block 204 may be selected.

One reference block 204 is extracted so as not to overlap with another adjacent reference block 204. In this example, the adjacent reference blocks 204 are extracted, and thus all 6,750 blocks (150 blocks in the horizontal directions×45 blocks in the vertical directions) are sequentially extracted as the reference block 204, for all the pixels 202 displayed within the detection area (for example, 600 pixels in the horizontal directions×180 pixels in the vertical directions).

Since the average value difference matching is adopted in this example as described above, the evaluation value deriving module 160 calculates, as illustrated in FIG. 3B, an average value Ab of luminance Rb(i, j) of the pixels 202 within an area 206 represented by 8 pixels in the horizontal directions×8 pixels in the vertical directions around the reference block 204 centering on the reference block 204 based on the following Equation 1:

$$Ab = \Sigma Rb(i,j)/64 \qquad \text{(Equation 1)}$$

Note that "i" is a horizontal pixel position in the area 206 (i=1 to 8), and "j" is a vertical pixel position in the area 206 (j=1 to 8). If the area 206 is partially located outside the reference image 200 (i.e., the area 206 is partially missing at an end of the reference image 200), the average value Ab is calculated while the missing part is omitted.

The evaluation value deriving module 160 subtracts the above-described average value Ab from a luminance Eb(i, j) of each of the pixels 202 within the reference block 204 to derive an average value difference luminance EEb(i, j) as the following Equation 2;

$$EEb(i,j) = Eb(i,j) - Ab \qquad \text{(Equation 2)}$$

Note that "i" is a horizontal pixel position in the reference block 204 (i=1 to 4), and "j" is a vertical pixel position in the reference block 204 (j=1 to 4).

The evaluation value deriving module 160 then extracts a block 214 (hereinafter, referred to as "the comparison block") represented by the matrix of pixels 212, for example, of 4 pixels in the horizontal directions×4 pixels in the vertical directions from the comparison image 210, as illustrated in FIG. 3C. Note that the evaluation value deriving module 160 sequentially extracts, for each one of the reference blocks 204, multiple comparison blocks 214, and derives the evaluation values indicative of correlations with the respective reference blocks 204.

The comparison block 214 is shifted by, for example, 1 pixel at a time in the horizontal direction and then extracted and, thus, the pixels of the adjacent comparison blocks 214 are overlapped. In this example, the total of 128 comparison blocks 214 to the left and right in the horizontal direction are extracted, for each one of the reference blocks 204, with respect to a position 216 corresponding to the reference block 204. Therefore, the extraction area (search area) has 131 pixels (=128+3 pixels) in the horizontal directions×4 pixels in the vertical directions. The positional relationship between the position 216 corresponding to the reference block 204 and the extraction area is set according to the appearing pattern of the parallaxes between the reference image 200 and the comparison image 210.

Since the average value difference matching is adopted in this example as described above, the evaluation value deriving module 160 calculates an average value Ac of luminance Rc(i, j) of pixels within an area represented by 8 pixels in the horizontal directions×8 pixels in the vertical directions around the comparison block 214 centering on the comparison block 214 based on the following Equation 3, similar to the reference block 204:

$$Ac = \Sigma Rc(i,j)/64 \qquad \text{(Equation 3)}$$

Note that "i" is a horizontal pixel position in the area (i=1 to 8), and "j" is a vertical pixel position in the area (j=1 to 8).

Next, the evaluation value deriving module 160 subtracts the above-described average value Ac from a luminance Ec(i, j) of each of the pixels within the comparison block 214 to derive an average value difference luminance EEc(i, j), as the following Equation 4:

$$EEc(i,j) = Ec(i,j) - Ac \qquad \text{(Equation 4)}$$

Note that "i" is a horizontal pixel position in the comparison block 214 (i=1 to 4), and "j" is a vertical pixel position in the comparison block 214 (j=1 to 4).

Next, the evaluation value deriving module 160 subtracts, from the average value difference luminance EEb(i, j) of each pixel 202 of the reference block 204, the average value difference luminance EEc(i, j) of each pixel 212 corresponding to the same position in the comparison block 214, and integrates the subtraction results to derive an evaluation value S, as illustrated in the following Equation 5:

$$S = \Sigma(EEb(i,j) - EEc(i,j)) \qquad \text{(Equation 5)}$$

Thus, the multiple derived evaluation values S have higher correlations as the evaluation values S themselves have smaller values, i.e., smaller differences. Therefore, among the multiple evaluation values (here, 128 evaluation values) of one reference block 204 with the comparison blocks 214, the position of the minimum evaluation value (minimum value) serves as a candidate of the position indicating an end of the parallaxes.

When the minimum evaluation value for any reference block 204 is derived, the evaluation value deriving module 160 holds, in a predetermined area of the data holding unit 152, a difference between coordinates of the comparison block 214 corresponding to the minimum value and coordinates of the reference block 204 (the position 216 corresponding to the reference block 204) as the parallax. Therefore, the data holding unit 152 holds the parallaxes of 6,750 reference blocks 204 (=150 blocks in the horizontal directions×45 blocks in the vertical directions).

The above-described average value difference matching only uses high-frequency components of the image for the matching, and can remove low-frequency noise because it has an equivalent function to a high-pass filter. In addition, the matching has high accuracy of identifying the parallaxes and thus can improve accuracy of deriving the parallaxes, even under the effects of slight imbalance in luminance between the reference image 200 and the comparison image 210, and the effects of gain variation due to aging of the cameras (imaging devices) and/or analog circuit components.

Figure 4:
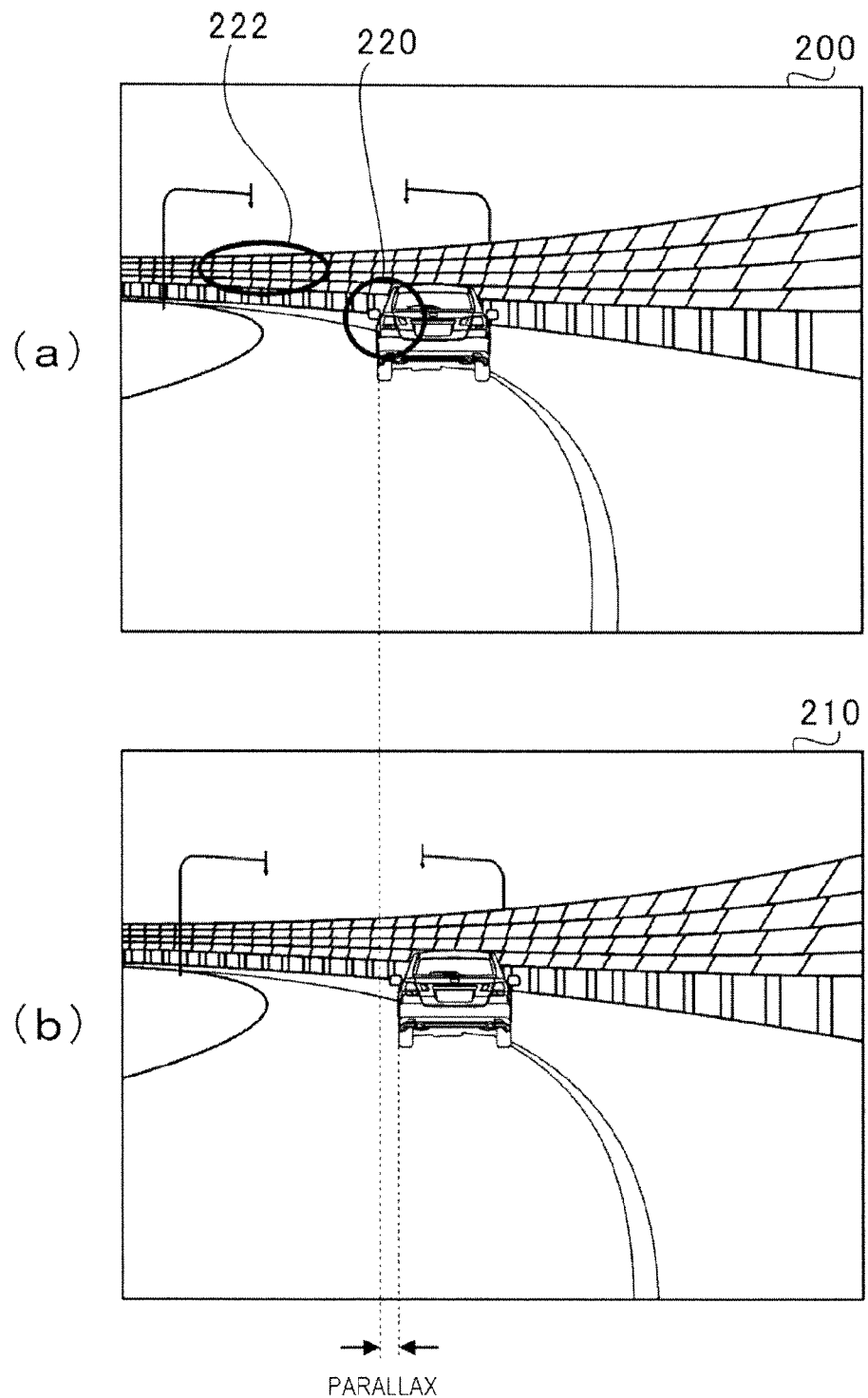
FIG. 4 is illustrates a reference image and a comparison image.

FIG. 4 is illustrates the reference image 200 and the comparison image 210. The upper part (a) of FIG. 4 illustrates the image from one of the imaging devices 110 located on the right, while the lower part (b) illustrates the corresponding image from the other imaging device 110 located on the left. In this example, the right image is used as the reference image 200, and the left image is used as the comparison image 210.

When the evaluation value deriving module 160 derives the evaluation values based on the reference image 200 and the comparison image 210, it is easy to derive the parallaxes and perform the pattern matching because an edge appears at a side end of a track in an area 220 illustrated in the upper part (a) of FIG. 4.

On the other hand, like a nose barrier in an area 222 illustrated in the upper part (a) of FIG. 4, subject parts having similar features (here, a pattern of fence) are repeated continuously in the horizontal directions, the reference block 204 of the reference image 200 is matched with the comparison block 214 which should not be matched within the comparison image 210, leading to erroneous derivations of the parallaxes.

Figure 5A:
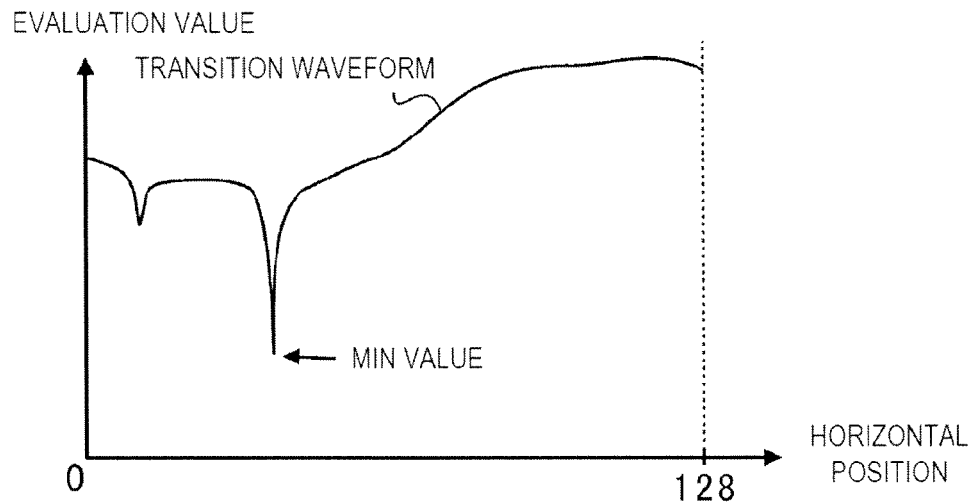
FIGS. 5A and 5B are graphs illustrating transitions of evaluation values in two arbitrary areas.
Figure 5B:
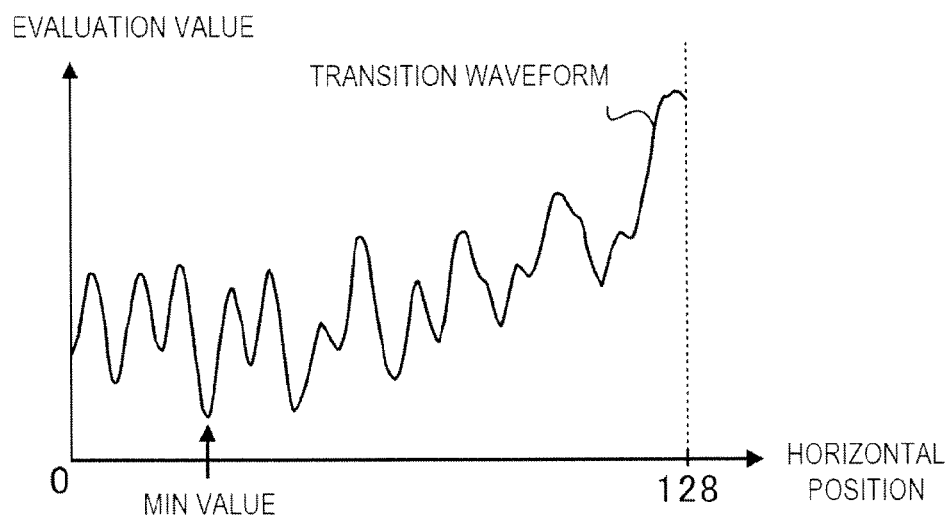

FIGS. 5A and 5B are graphs illustrating transitions of the evaluation values in the two areas 220 and 222 described above. FIG. 5A illustrates an instance of any one of the reference blocks 204 in the area 220, and FIG. 5B illustrates an instance of any on of the reference blocks 204 in the area 222. In FIGS. 5A and 5B, the horizontal axis represents the horizontal position of the comparison block 214, and the vertical axis represents the evaluation value. Smaller evaluation values indicate higher correlations.

In FIG. 5A, since the blocks compared in the area 220 are characteristic, the evaluation value projects locally toward a smaller value, and a minimum value (i.e., global minima) appears clearly. On the other hand, in FIG. 5B, multiple inflection points (points at which inclinations become zero) appear corresponding to minimum values (i.e., local minimum) of the evaluation value where the waveforms become downwardly convexes. Thus, depending on display modes of the reference image 200 and the comparison image 210, another inflection point (or local minima) located near the global minima may be erroneously recognized as the global minima, leading to an erroneous recognition of the parallax at the incorrect inflection point.

For this reason, the vehicle exterior environment recognition device 120 of this example focuses on the transition waveform which is a waveform formed by the evaluation values of the pattern matching. The vehicle exterior environment recognition device 120 determines whether another waveform part similar to a waveform part near the global minima of the evaluation value (where the correlation becomes the highest in the entire transition waveform) exists, that is, whether a transition waveform has repeatability. If multiple similar waveform parts exist in the transition waveform, the vehicle exterior environment recognition device 120 determines that the evaluation value is not reliable and is invalidated as the parallax. Below, this processing will be described in more detail.

The reference waveform part setting module 162 identifies the inflection point based on the transition waveform comprised of the multiple evaluation values, and sets a reference waveform part containing the global minima based on the evaluation value of which the correlation is highest and a inflection point selected from the identified inflection points.

Figure 6A:
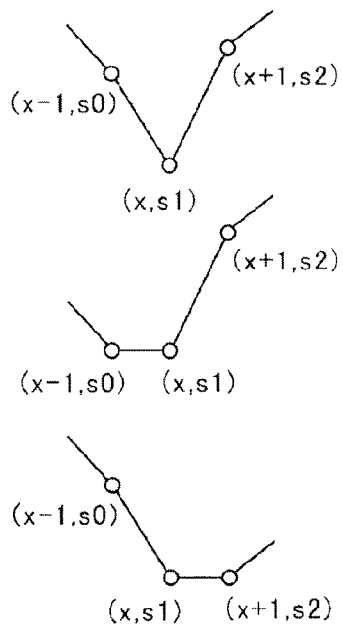
FIGS. 6A and 6B are diagrams illustrating particular processing of inflection points.
Figure 6B:
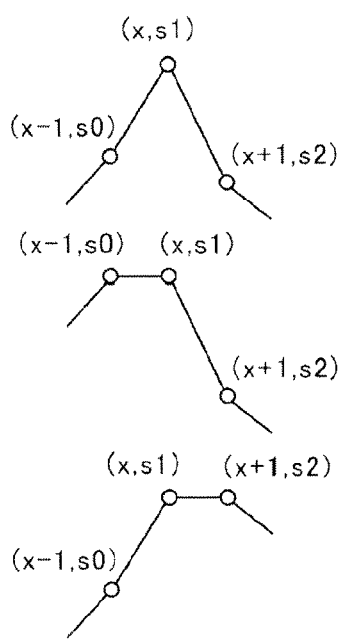

FIGS. 6A and 6B are diagrams illustrating particular processing of the inflection points. Since the inflection point is a point at which the inclination of the transition waveform becomes zero, both of two points before and after the inflection point in the horizontal directions (i.e., one point before the inflection point and one point after the inflection point) are equal to or greater than or less than the inflection point. Specifically, suppose that the horizontal positions and the evaluation values of the comparison block 214 at three adjacent points are (x−1, s0), (x, s1), and (x+1, s2), respectively. If the relation of these points satisfies the Equation 6 or 7 described below, the relation of the points becomes as illustrated in FIG. 6A, and the evaluation value s1 of the horizontal position x is at the downwardly-convex inflection point (hereinafter, referred to as "the trough inflection point").

$s0 \geq s1$ and $s1 < s2$ (Equation 6)

$s0 > s1$ and $s1 \leq s2$ (Equation 7)

On the other hand, if the relation of the points satisfies the Equation 8 or 9 described below, the relation of the points becomes as illustrated in FIG. 6B, and the evaluation value s1 of the horizontal position x is at the upwardly-convex inflection point (hereinafter, referred to as "the crest inflection point").

$s0 \leq s1$ and $s1 > s2$ (Equation 8)

$s0 < s1$ and $s1 \geq s2$ (Equation 9)

Figure 7:
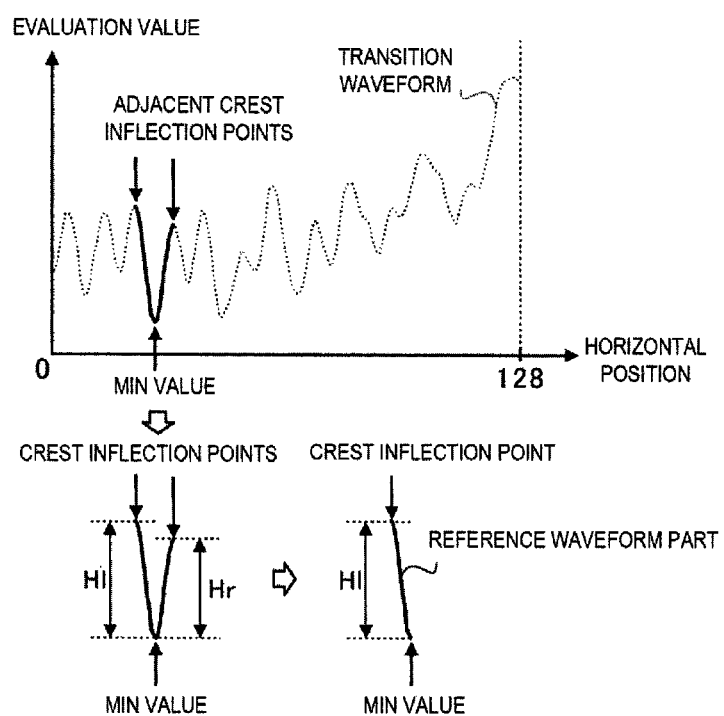
FIG. 7 is a graph illustrating a reference waveform part.

FIG. 7 is a graph illustrating the reference waveform part. The reference waveform part setting module 162 derives differences between the minimum value which is also the trough inflection point and the evaluation values at the two inflection points (crest inflection points) which are adjacent before and after in the horizontal directions to the minimum value (where the inclination of the transition waveform becomes zero for the first time), respectively. Hereinafter, the difference in the evaluation value from the crest inflection point located at the left side in the horizontal direction is referred to as "difference Hl", and the difference in the evaluation value from the crest inflection point located at the right side in the horizontal direction is referred to as "difference Hr". Then, as illustrated in FIG. 7, the reference waveform part setting module 162 sets, as the reference waveform part, either one of the two waveform parts, whichever has a greater difference in the evaluation value between the minimum value and the crest inflection point (here, a transition waveform up to the inflection point on the difference Hl side in the evaluation value. Of course, if the difference Hr in the evaluation value is greater than the difference Hl, the transition waveform up to the inflection point on the difference Hr side in the evaluation value is selected as the reference waveform part.

As described above, since the reference waveform part is formed by a waveform part only with one of the inflection points with respect to the minimum value, processing load at the time of comparing the waveform parts can be reduced. In addition, it is possible to extract waveform parts similar to the reference waveform part with high precision by selecting, as the inflection point, an inflection point having a greater difference (i.e., more characteristic) in the evaluation value from the minimum value.

The difference value determining module 164 determines whether similar waveform parts which are similar to the reference waveform part exist in the transition waveform, and, based on the results, it determines whether the minimum evaluation value is valid as the parallax. The difference value determining module 164 narrows down the waveform through multiple conditions in order to determine whether the similar waveform parts which are similar to the reference waveform part exist to detect waveform part(s) which satisfies all the conditions. In this example, the waveforms which satisfy three conditions are selected as the similar waveform parts.

Figure 8A:
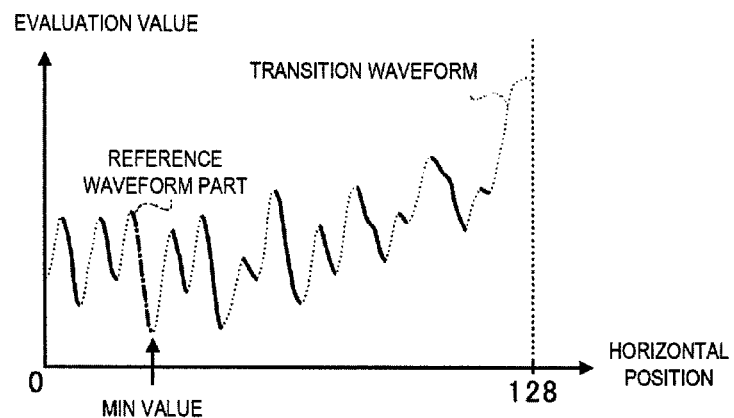
FIGS. 8A and 8B are graphs illustrating narrow-downs of similar waveform parts by a difference value determining module.
Figure 8B:
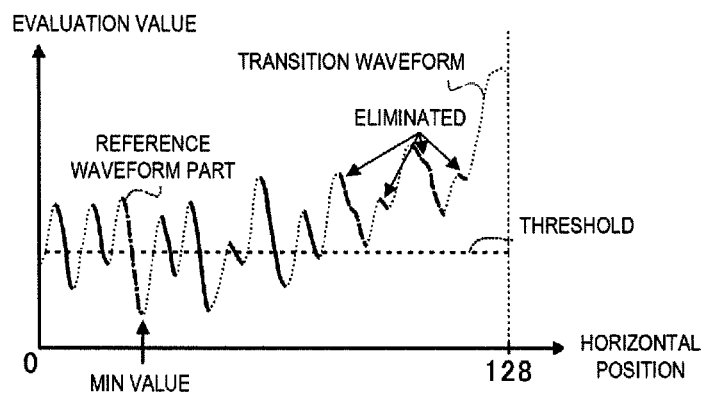

FIGS. 8A and 8B, and 9 and 10 are graphs illustrating the narrow-downs of the similar waveform parts by the difference value determining module 164. As illustrated in FIG. 8A, the difference value determining module 164 first extracts from the transition waveform as candidates of the similar waveform parts illustrated by solid lines in FIG. 8A, all the waveforms which have inclinations equivalent to the reference waveform part illustrated by a dashed dotted line, that is, waveforms each having the crest inflection point on the left side in the horizontal direction and the trough inflection point on the right side in the horizontal direction. Next, as illustrated in FIG. 8B, the difference value determining module 164 eliminates waveform parts illustrated by dashed lines in this drawing, of which absolute values of the evaluation values at the trough inflection points are not close to the trough inflection point (minimum value) of the reference waveform part, that is, of which the absolute values of the evaluation values at the trough inflection points are equal to or greater than a predetermined threshold. Thus, only waveforms of which the absolute values of the evaluation values at the trough inflection points are less than the predetermined threshold will remain as the candidates of the similar waveform parts.

Note that the predetermined threshold D is determined by the following Equation 10:

$$D = H \times Gd + P + B \quad \text{(Equation 10)}$$

Note that H is difference Hl or Hr in the evaluation value described above, whichever is greater than the other, Gd is a gain which is set, and P is the minimum value, and B is an optionally-set offset.

According to the above configuration, the waveform parts of which the absolute values of the evaluation values at the trough inflection points are apart from the minimum value, that is, which should not be accepted as the parallaxes, can be effectively eliminated.

Figure 9:
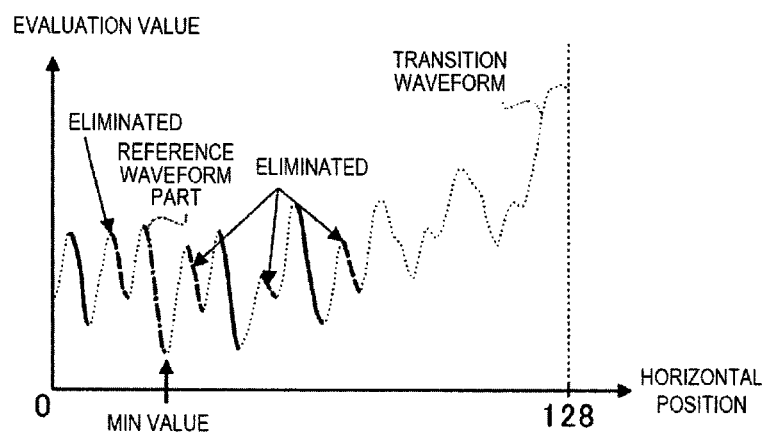
FIG. 9 is a graph illustrating the narrow-down of similar waveform parts by the difference value determining module.

Next, as illustrated in FIG. 9, the difference value determining module 164 eliminates, from the waveform parts narrowed down by Equation 10, waveform parts illustrated by dashed lines which are not close to the difference in the evaluation value between the minimum value (local minima) and the crest inflection point (the inflection point at which the inclination of the transition waveform becomes zero for the first time), that is, differences V in the evaluation value between the crest inflection point and the trough inflection point are not within a predetermined range. Thus, only waveform parts of which the differences V in the evaluation value between the crest inflection point and the trough inflection point are within the predetermined range will remain as the candidates of the similar waveform parts.

Note that whether the difference V is within the predetermined range is defined by the following Equation 11:

$$H \times Gl < V < H \times Gh \quad \text{(Equation 11)}$$

Note that H is the difference Hl or Hr in the evaluation value described above, whichever is greater than the other, and Gl and Gh are gains which define an upper limit and a lower limit, respectively.

According to this configuration, the waveform parts which should not be determined to be similar to the reference waveform part, of which the differences V in the evaluation value between the crest inflection points and the trough inflection points are apart from the difference in the evaluation value between the crest inflection point and the trough inflection point in the reference waveform part, can be effectively eliminated.

Figure 10:
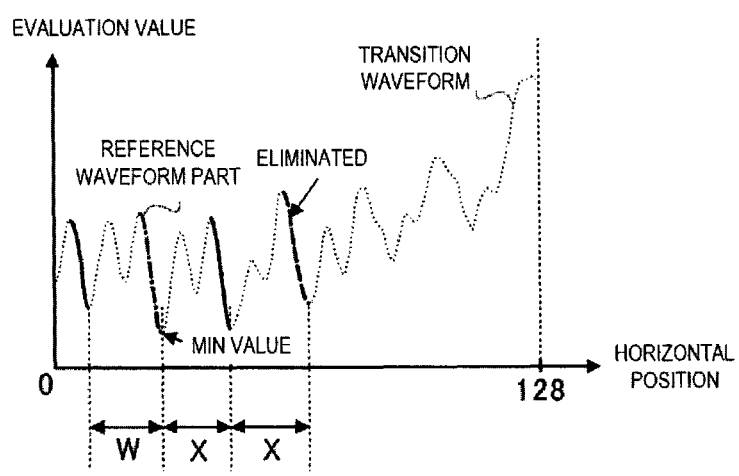
FIG. 10 is a graph illustrating the narrow-down of similar waveform parts by the difference value determining module.

Next, as illustrated in FIG. 10, the difference value determining module 164 eliminates from the waveform parts narrowed down by Equation 11, waveform parts (only one is applicable in FIG. 10) illustrated by a dashed line which is not close to a horizontal difference from the minimum value (global minima) to a trough inflection point which satisfied the predetermined conditions, that is, as illustrated in the Equation 12 described below, waveform part(s) of which an absolute value of a difference between a horizontal difference W from the minimum value (global minima) to a predetermined trough inflection point and a horizontal difference X between the trough inflection points of the waveform parts narrowed down by Equation 11, are equal to or greater than a predetermined threshold T. Thus, only waveform parts of which the horizontal differences between the trough inflection points are close to the horizontal difference from the minimum value (global minima) to the predetermined trough inflection point will remain as the candidates of the similar waveform parts.

$$|W - X| < T \quad \text{(Equation 12)}$$

Note that the predetermined trough inflection point is a trough inflection point of one of two waveform parts which are located before and after the reference waveform part in the horizontal directions, among the waveform parts narrowed down by Equation 11. The trough inflection point of the waveform part located at the left side of the reference waveform part is used as the predetermined trough inflection point in the instance of FIG. 10. Alternatively, the trough inflection point of the waveform part located at the right side of the reference waveform part may also be used as the predetermined trough inflection point. The difference value determining module 164 selects the waveforms thus remained as the similar waveform parts.

According to this configuration, the waveform parts of which the horizontal difference X between the trough inflection points is significantly different from the horizontal difference W from the minimum value (global minima) to the predetermined trough inflection point, and the waveform parts of which the distance between the waveform parts should not be accepted to be similar to the distance between the waveform parts containing the reference waveform part, can be effectively eliminated.

Next, the difference value determining module 164 determines whether the minimum value is valid based on the one or more similar waveform parts which are waveform parts narrowed down by Equation 12, as the parallax. Specifically, based on whether the number of similar waveform parts (or the number of trough inflection points thereof) equals to or greater than a predetermined threshold (e.g., 2 or more), the difference value determining module 164 invalidates the minimum value as the parallax if the number of similar waveform parts equals to or greater than the predetermined threshold as illustrated in FIG. 10.

Alternatively or additionally to the number of the similar waveform parts described above, the similar waveform part may be determined to be located before and after the reference waveform part in the horizontal directions. For example, in the instance of FIG. 10, since the similar waveform parts exist both before and after the reference waveform part in the horizontal directions, the minimum value is invalidated as the parallax.

As described above, in this example, it is determined, through multiple conditions, whether waveform part(s) similar to a waveform part near the minimum evaluation value exists, that is, whether the transition waveform has repeatability. If multiple similar waveform parts exist in the transition waveform, the minimum value is determined to be unreliable and the minimum value is invalidated as the parallax. Thus, it is possible to effectively exclude the parallaxes which should be invalidated.

One or more programs which cause one or more computers to function as the filtering device and/or environment recognition system described above, and one or more storage media which record the program(s), such as flexible discs, magneto-optic discs, ROMs, CDs, DVDs, BDs, which can be read by the computer(s), are also provided. Note that the term "program" as used herein refers to a data set described with any languages and any describing methods.

As above, although the suitable example of the present disclosure is described with reference to the accompanying drawings, the present disclosure is not intended to be limited to the above example. It is apparent that a person skilled in the art can reach various changes or modifications without departing from the scope of the present disclosure described in the appended claims, and it should be understood that those derivatives naturally encompass the technical scope of the present disclosure.

For example, in the above example, although the pair of images which are simultaneously imaged by the two imaging devices 110 of which viewpoints differ from each other are used as the comparison targets, the present disclosure is widely applicable to a pair of images which have mutual relevance, without limiting to the images described above. Such a pair of images having mutual relevance include, for example, two images which are imaged by a single imaging device (e.g., a monocular camera) at different timings and outputted in a time series, which are processing targets of so-called an optical flow; and a combination of an image captured or imaged and an image prepared in advance, which are processing targets of so-called template matching. Although the "parallax" between the pair of images simultaneously imaged by the two imaging devices 110 of which viewpoints differ from each other is described as the difference value in the example described above, the difference value may be a difference between corresponding extracted parts, such as a difference between reference blocks in the pair of images having mutual relevance, without limiting to the above.

Further, although the luminance images are used as the comparison targets to derive the evaluation values based on the luminances of the luminance images in the example described above, the evaluation values may also be derived based on information other than the luminances, such as a heat distribution acquired from a far-infrared camera, or a distribution of reflection intensity obtained from a laser radar or a millimeter wave radar, as the comparison target. Also in this case, a difference value refers to the difference between the corresponding extracted parts, similar to the above.

The present disclosure can be used for the filtering device and the environment recognition system which determine, when calculating the difference value (parallax) of the object in the multiple images, whether the difference value is valid.

The invention claimed is:

1. A filtering device, comprising one or more processors, configured to:
    derive, for a pair of comparison targets having mutual relevance, multiple evaluation values indicative of correlations between an extracted part that is selectively extracted from one of the comparison targets and multiple extracted parts extracted from the other comparison target, respectively;
    set a reference waveform part of a transition waveform comprised of the multiple evaluation values, the reference waveform part containing the evaluation value with the highest correlation;
    determine whether the transition waveform contains one or more parts that are similar to the reference waveform part, and determine, based on the result of the determination, whether a difference value for the evaluation value with the highest correlation is valid as the difference value; and
    select as the reference waveform part one of two parts of the transition waveform that are located from (1) a first inflection point at which the evaluation value has the highest correlation to (2) second and third inflection points before and after the first inflection point in horizontal directions at which inclinations of the transition waveform become zero for the first time, respectively, the part selected as the reference waveform part being the one of the two parts having a larger difference between the evaluation value of the first inflection point with the highest correlation and an evaluation value of either one of the second and third inflection points.

2. The filtering device of claim 1, wherein one or more processors are further configured to select parts of the transition waveform having one or more parameters close to the parameters of the reference waveform part as the one or more parts that are similar to the reference waveform part, the one or more parameters being selected from the group consisting of:
    an absolute value of the evaluation value of an inflection point at which an inclination of the transition waveform becomes zero;
    a difference between the evaluation value with the highest correlation and an evaluation value of an inflection point at which the inclination of the transition waveform becomes zero for the first time; and
    a horizontal difference between the evaluation value with the highest correlation and an evaluation value of an inflection point that satisfies a predetermined condition.

3. The filtering device of claim 1, wherein the comparison target is an image and the extracted part is a block consisting of one or more pixels in the image.

4. The filtering device of claim 2, wherein the comparison target is an image and the extracted part is a block consisting of one or more pixels in the image.

5. An environment recognition system, comprising:
    one or more imaging devices configured to generate a pair of images having mutual relevance;
    one or more processors, configured to:
    derive, for the pair of generated images, multiple evaluation values indicative of correlations between a block extracted from one of the images and multiple blocks extracted from the other image, respectively, to form a transition waveform comprised of the multiple evaluation values;
    set a reference waveform part of the transition waveform, the reference waveform part containing the evaluation value having the highest correlation;
    determine whether the transition waveform contains one or more waveform parts that are similar to the reference waveform part; and
    determine whether a parallax for the evaluation value with the highest correlation is valid as the parallax, where the parallax is valid if the transition waveform contains fewer than a predetermined number of waveform parts that are similar to the reference waveform part.

6. The environment recognition system of claim 5, wherein the one or more imaging devices configured to generate a pair of images include a pair of imaging devices separated from each other by a predetermined distance and oriented substantially parallel to each other to generate a pair of images of a detection area.

7. The environment recognition system of claim 6, wherein the one or more processors are further configured to: if the parallax for the evaluation value with the highest correlation is valid as the parallax, calculate a relative distance of an object in the block extracted from one of the images based on the parallax and the predetermined distance between the pair of imaging devices.

8. The environment recognition system of claim 5, wherein the one or more imaging devices configured to generate a pair of images include an imaging device to generate a pair of images imaged at different times.

9. The environment recognition system of claim 8, wherein the one or more processors are further configured to: if the parallax for the evaluation value with the highest correlation is valid as the parallax, calculate a relative motion for an object in the block extracted from one of the images based on the parallax and the time difference between the pair of images.

10. The environment recognition system of claim 5, wherein the one or more imaging devices configured to generate a pair of images include an imaging device to generate an image to be paired with another image captured in advance.

* * * * *